G. H. WILLIAMS.
DRAG BUCKET.
APPLICATION FILED SEPT. 2, 1910.
1,027,301.
Patented May 21, 1912.
3 SHEETS—SHEET 1.
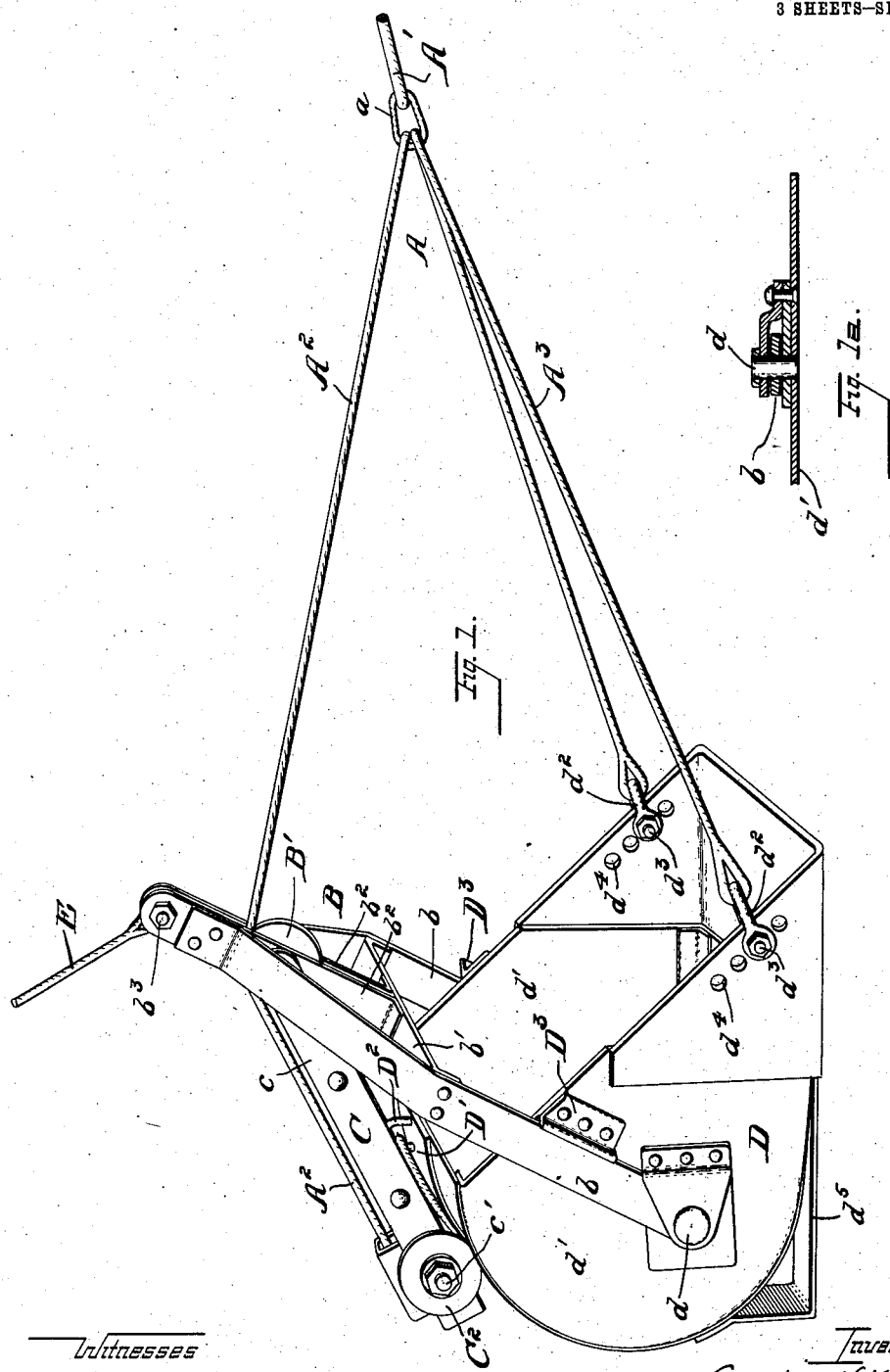
Witnesses
Herman Esele
Curt B. Mueller
Inventor:
Gurdon H. Williams,
By A. O. Merkel,
his Attorney G. H. WILLIAMS.
DRAG BUCKET.
APPLICATION FILED SEPT. 2, 1910.
1,027,301.
Patented May 21, 1912.
3 SHEETS—SHEET 2.
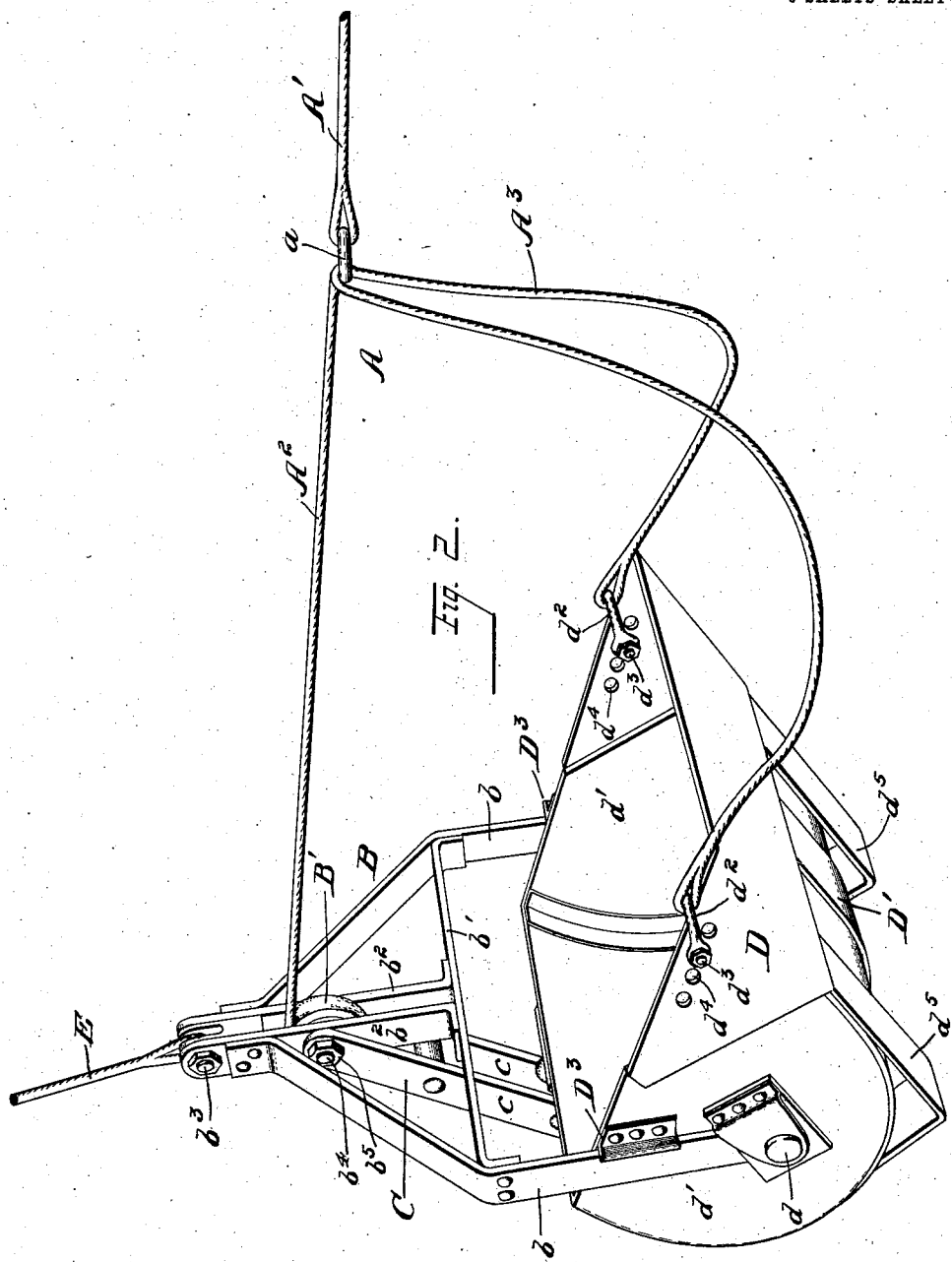

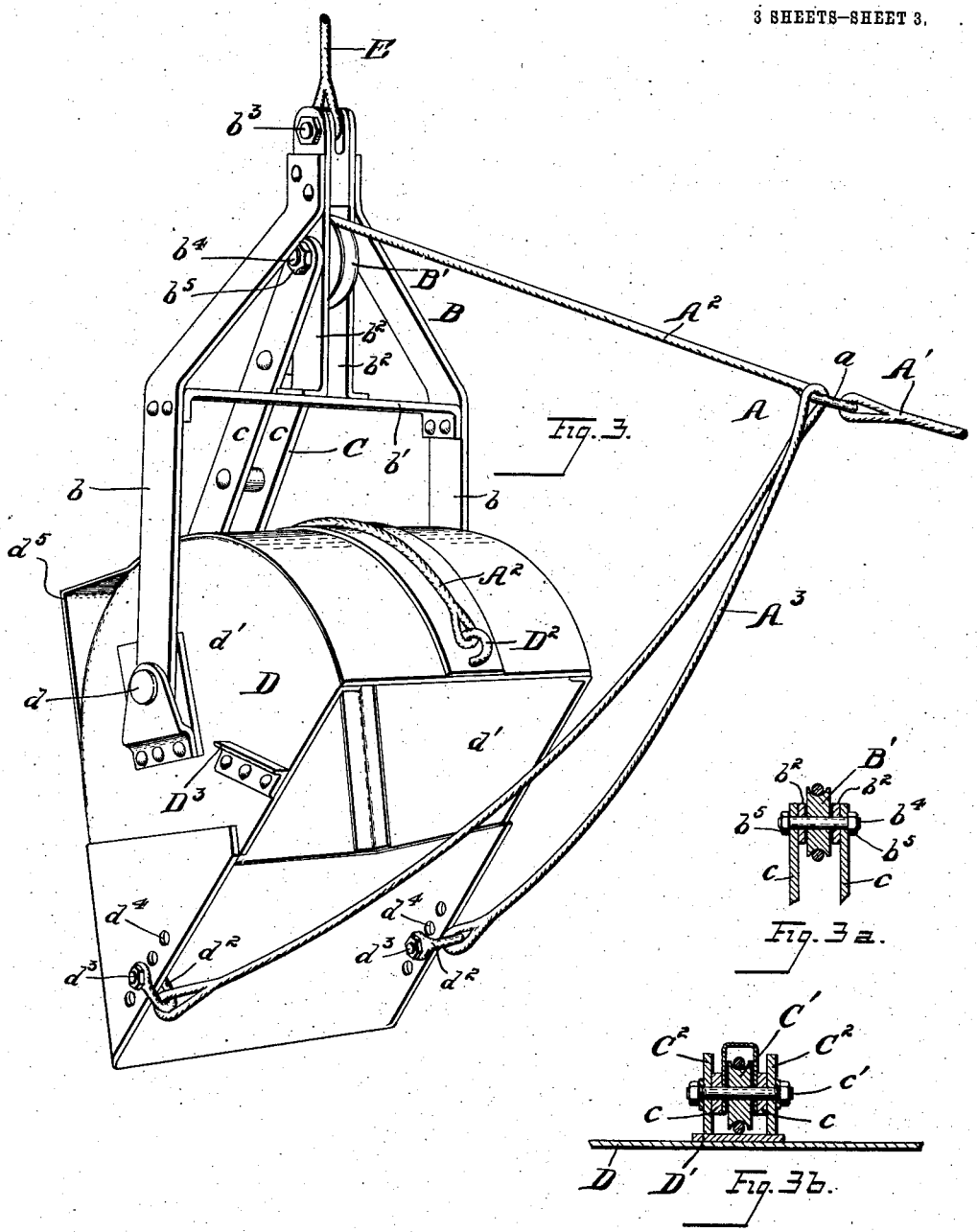

UNITED STATES PATENT OFFICE.

GURDON H. WILLIAMS, OF CLEVELAND, OHIO, ASSIGNOR TO THE G. H. WILLIAMS COMPANY, OF CLEVELAND, OHIO, A CORPORATION OF OHIO.

DRAG-BUCKET.

1,027,301. Specification of Letters Patent. Patented May 21, 1912.

Application filed September 2, 1910. Serial No. 580,241.

*To all whom it may concern:*

Be it known that I, GURDON H. WILLIAMS, a citizen of the United States, resident of Cleveland, county of Cuyahoga, and State of Ohio, have invented a new and useful Improvement in Drag-Buckets, of which the following is a specification, the principle of the invention being herein explained and the best mode in which I have contemplated applying that principle, so as to distinguish it from other inventions.

My invention relates to excavating devices, and particularly to that class thereof ordinarily referred to as drag buckets.

The object of my invention is to construct a drag bucket which will be economical in its manufacture and efficient in its operation.

The said invention consists of means hereinafter fully described and particularly set forth in the claims.

The annexed drawings and the following description set forth in detail certain mechanism embodying my invention, the disclosed means, however, constituting but one of various mechanical forms in which the principle of the invention may be used.

In said annexed drawings:—Figure 1 is a perspective of a drag bucket embodying my invention, showing the same in the position which it occupies when effecting its operative or excavating function. Fig. 1$^a$ is a detail section. Fig. 2 is a perspective of a bucket shown in the position which it occupies when being hoisted with a load. Fig. 3 is a perspective of the bucket shown in its dumping or discharging position. Figs. 3$^a$ and 3$^b$ are detail sections of parts of the mechanism.

The bucket embodying my invention comprises the following general parts: first, the drag line A, which comprises the main drag line member A′, the auxiliary controlling drag line member A$^2$, and the secondary drag line member or loop A$^3$; second, the frame B; third, the oscillatory arm C; fourth, the scoop member or bucket D, and, fifth, the hoisting line E.

The frame B consists of the two side bars $b$ $b$ braced by the cross piece $b'$, and having their lower ends pivoted on pins $d$ fixed to the opposite side members $d'$ $d'$ of the scoop member, as shown in detail in Fig. 1$^a$. The upper ends of the side bars $b$ $b$ converge and embrace between them the uprights $b^2$ $b^2$, Fig. 2, whose lower ends are suitably secured to the cross bar $b'$. A pin $b^3$ is seated in the upper ends of the members $b^2$ $b^2$, to which is hitched the hoisting line E.

A pin $b^4$ passes through the uprights $b^2$ $b^2$ and forms a journal for a sheave B′. The ends of this pin project sufficiently, as shown in Fig. 3$^a$, to form a journal for the upper ends of two side members $c$ $c$, of the oscillatory arm C, suitable nuts $b^5$ being provided for retaining the latter in place. The outer or free extremity of the arm C carries a pin $c'$, Fig. 3$^b$, which forms a journal for a second sheave C′, located between the two bars $c$ $c$. The outer ends of this pin project sufficiently to form journals for rollers C$^2$ C$^2$ which run upon a track D′ forming a part of the bucket or scoop member D, as shown in said Fig. 3$^b$. At a point fixed to the curved rear member of the bucket or scoop member is a staple D$^2$, to which is hitched the auxiliary controlling member A$^2$ of the drag line. This auxiliary member passes from the said staple around the under side of the sheave C′ and then over the sheave B′, its other end being secured to a link $a$, to which the main drag line member A′ is secured. Also secured to the link $a$ is the loop A$^3$, whose extremities are respectively secured to the clevises $d^2$ $d^2$. These latter are secured by means of suitable bolts and nuts $d^3$ which pass through suitable apertures $d^4$ formed in the opposite side members of the bucket or scoop. A plurality of these apertures are provided, as shown in the drawings, whereby the clevises may be placed at different positions, and therefore the drag line loop connected with the bucket or scoop at various points near the mouth or scooping end of the scoop member, as will be readily understood.

Fixedly secured to the side members respectively and upon the outside thereof, are two stops $D^3$ $D^3$, as shown in Fig. 1, which limit the oscillatory movement of the frame B with reference to the scoop member. The axis of oscillation of the scoop member on its frame is placed so that when the drag line is slackened, the bucket will normally assume an open or discharging position, as shown in Fig. 3.

From the above description, it will be noted that when the auxiliary line $A^2$ is in tension, the free end of the oscillatory arm C tends to move toward the bucket, that is, the two rollers $c$ $c$ are caused to engage and run upon the track $D'$.

The under side of the bucket D is provided with a runner $d^5$, which serves as a bearing upon the surface of the earth when the bucket is being dragged along in its operative or excavating position, and thereby serves to maintain the bucket in such position during such operation, as will be readily understood.

I shall now describe the operation of the mechanism as above described, and in so doing will first assume that the bucket is in its dumping or discharging position, shown in Fig. 3, in which the boom or hoisting line E is perpendicular, and the drag line is slacked off, and therefore not in tension. The parts being in this position when it is desired to effect an excavating operation, the boom or hoisting line is slackened off until the bucket strikes the ground. When this occurs, the cutting or excavating edge of the bucket strikes the ground first, and when the boom or hoisting line is further slackened away the bucket drops so as to assume the position shown in Fig. 1, in which the runner $d^5$ is in contact with the ground also. A further slackening away of the boom line permits the frame B to fall forward slightly until it strikes the stops $D^2$, as shown in Fig. 1, the drag line, it being understood, being still slacked away, and the auxiliary line $A^2$ therefore being permitted to run around the sheaves $B'$ and $C'$, the rollers $c$ $c$ running backward on the track $D'$. The boom line is then permitted to run free and the drag line then brought up taut, until the loop $A^3$ and auxiliary line $A^2$ are taut. A further hauling of the drag line will therefore drag the bucket and effect an excavating operation. This dragging operation is continued until the bucket is full. When this occurs, the boom or hoisting line is then hauled in, the drag line, however, being permitted to slack off, but at the same time remain in tension. This will maintain the engagement of the frame B with the stops $D^2$ $D^2$, and bring the bucket into the position shown in Fig. 2, which is the position in which the bucket and its load is raised. When the bucket is now raised to the position above that in which the load is to be deposited, the drag line is slacked off and the bucket therefore permitted to oscillate by gravity upon its axis, and the load so discharged and deposited.

Having fully described my invention, what I claim and desire to secure by Letters Patent is:—

1. In a drag bucket, the combination of a frame; a scoop member oscillatorily mounted upon the latter; a hoisting line secured to said frame; an oscillatory arm mounted upon said frame; and a drag line connected with said scoop member and engaging said oscillatory arm and frame, said drag line adapted to control the oscillation of said scoop member.

2. In a drag bucket, the combination of a frame; a scoop member oscillatorily mounted upon the latter; a hoisting line secured to said frame; a sheave mounted in the latter; an arm oscillatorily mounted upon said frame, and carrying a sheave at its free end; and a drag line passing over said two sheaves and having its free end secured to said scoop member.

3. In a drag bucket, the combination of a frame; a scoop member oscillatorily mounted upon the latter; a sheave mounted upon said frame; an arm oscillatorily mounted upon the latter and co-axially with said sheave, said arm carrying a sheave at its free end; and a drag line passing over said two sheaves and having its extremity secured to said scoop member.

4. In a drag bucket, the combination of a frame; a scoop member oscillatorily mounted upon the latter; a hoisting line secured to said frame; the axis of oscillation of said member being located so that it will normally assume a discharging position; a sheave mounted upon said frame; an arm oscillatorily mounted upon the latter, carrying a sheave at its free extremity; an auxiliary drag line member passing through said two sheaves and having its end secured to the scoop member at a point intermediate of the frame and said second named sheave when the scoop member is in its hoisting position; and a main drag line member connected with the forward or scooping end of said scoop member and also connected with said auxiliary drag line member.

5. In a drag bucket, the combination of a frame, a scoop member oscillatorily mounted upon the latter; a stop adapted to limit such oscillation, said stop being arranged so that when operative the scoop member will be in a raised or retaining position when suspended; a hoisting line secured to the frame for suspending the bucket; a rearwardly extending auxiliary frame oscillatorily mounted upon said first-named frame, provided with anti-friction rollers at its rear end adapted to engage the rear end of the bucket; a sheave in the free end of said auxiliary frame; a sheave mounted on said first-named frame; a line for controlling the oscillation of the scoop member, passing over said sheaves and having its one end secured to the rear end of said scoop member; a drag line connected with the front end of said scoop member, said auxiliary line being also connected with said drag line.

Signed by me, this 1st day of September, 1910.

GURDON H. WILLIAMS.

Attested by—
 WINIFRED WALTZ,
 CURT B. MUELLER.

Copies of this patent may be obtained for five cents each, by addressing the "Commissioner of Patents, Washington, D. C."